US009438364B2

United States Patent
Bui et al.

(10) Patent No.: US 9,438,364 B2
(45) Date of Patent: Sep. 6, 2016

(54) METHOD FOR SYNCHRONIZING DISTRIBUTED CLOCKS BY THE PRECISION TIME PROTOCOL, IN A TELECOMMUNICATION NETWORK

(71) Applicants: Dinh Thai Bui, Nozay (FR); Michel Le Pallec, Nozay (FR)

(72) Inventors: Dinh Thai Bui, Nozay (FR); Michel Le Pallec, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 11 days.

(21) Appl. No.: 14/418,057

(22) PCT Filed: Jun. 27, 2013

(86) PCT No.: PCT/EP2013/063517
§ 371 (c)(1),
(2) Date: Jan. 28, 2015

(87) PCT Pub. No.: WO2014/029533
PCT Pub. Date: Feb. 27, 2014

(65) Prior Publication Data
US 2015/0171980 A1    Jun. 18, 2015

(30) Foreign Application Priority Data

Aug. 22, 2012   (EP) .................................... 12306016

(51) Int. Cl.
*H04L 12/403* (2006.01)
*H04J 3/06* (2006.01)
(Continued)

(52) U.S. Cl.
CPC ............ *H04J 3/0658* (2013.01); *H04J 3/0667* (2013.01); *H04J 3/0682* (2013.01);*H04L 12/403* (2013.01); *H04L 43/10* (2013.01); *H04L 45/34* (2013.01); *H04L 45/745* (2013.01); *H04L 67/104* (2013.01)

(58) Field of Classification Search
CPC ....................... H04L 43/0852; H04L 43/0864
See application file for complete search history.

(56) References Cited

U.S. PATENT DOCUMENTS

2007/0115840 A1   5/2007  Feick et al.
2008/0225897 A1   9/2008  Bryant et al.

FOREIGN PATENT DOCUMENTS

EP   2487819 A1   8/2012
EP   2487836 A1   8/2012
(Continued)

OTHER PUBLICATIONS

International Search Report PCT/ISA/210 for International Application No. PCT/EP2013 Dated Oct. 30, 2013.

*Primary Examiner* — Huy D Vu
*Assistant Examiner* — Bao G Nguyen
(74) *Attorney, Agent, or Firm* — Harness, Dickey & Pierce, P.L.C.

(57) ABSTRACT

The method includes sending a Sync message from a first peer-to-peer transparent clock to a second peer-to-peer transparent clock, estimating the path delay of the transmission path traveled by the synchronization message from the first to the second peer-to-peer transparent clocks, and taking this path delay into account for updating the time information carried by a synchronization message. The estimating includes creating a list of the network addresses of the network interfaces traversed by the synchronization message; ordering the first list into the order in which the network interfaces have been traversed by the Sync message; creating a second list by reversing the order of the first list; communicating the second list to the second peer-to-peer transparent clock; and using the mechanism available at the transport protocol level, to constrain the respective paths of Pdelay_Req and Pdelay_Resp messages so that their respective paths map to the second and first ordered lists of traversed interfaces.

11 Claims, 9 Drawing Sheets

(51) Int. Cl.
*H04L 12/26* (2006.01)
*H04L 12/721* (2013.01)
*H04L 12/741* (2013.01)
*H04L 29/08* (2006.01)

(56) References Cited

FOREIGN PATENT DOCUMENTS

JP 2009065579 A 3/2009
JP 2011525308 A 9/2011

FIG_4

Peer delay mechanism deployed link-by-link

FIG_6

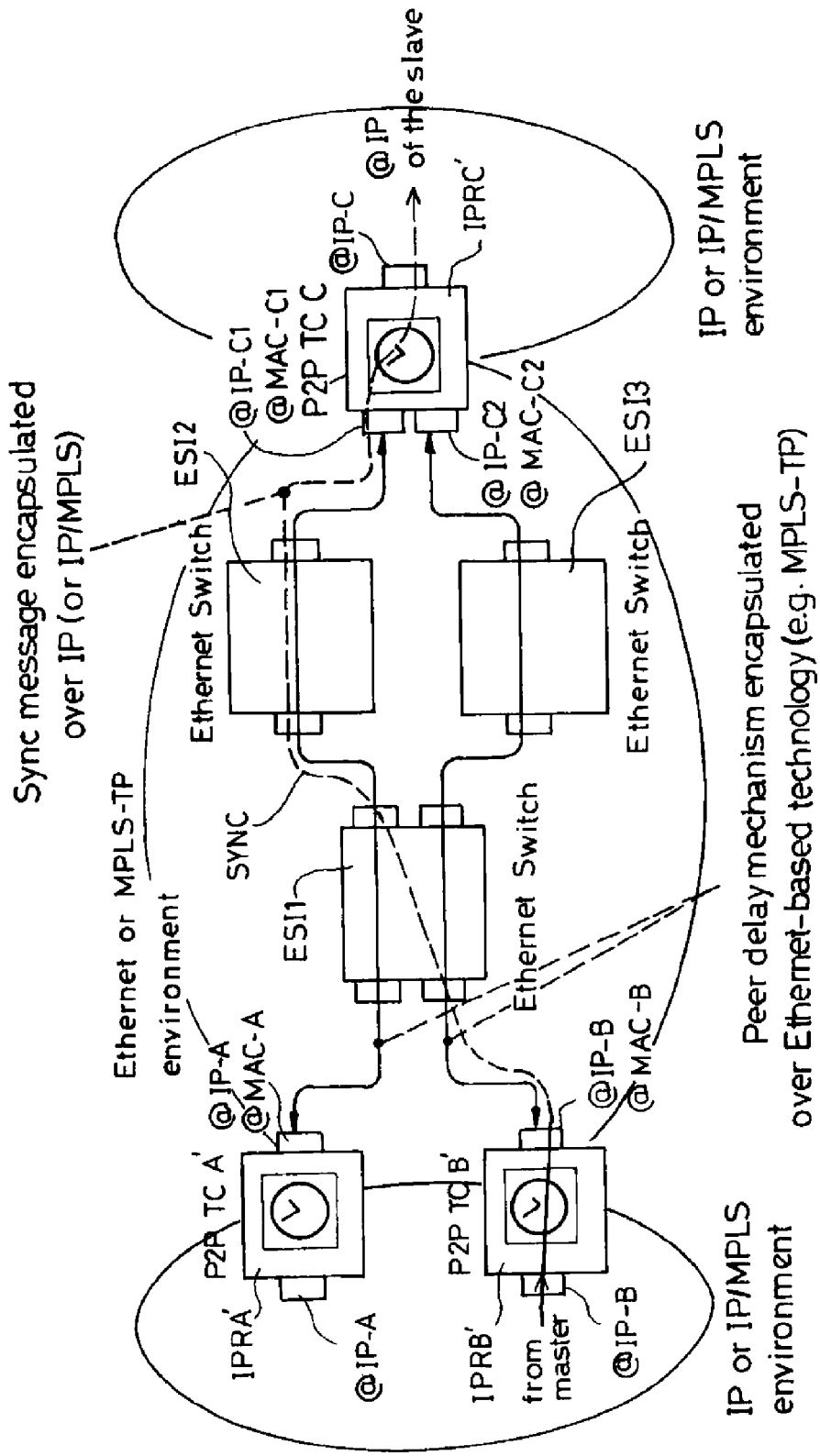
FIG_9

METHOD FOR SYNCHRONIZING DISTRIBUTED CLOCKS BY THE PRECISION TIME PROTOCOL, IN A TELECOMMUNICATION NETWORK

BACKGROUND OF THE INVENTION

1. Field of the Invention

The present invention generally relates to the estimation of path delays in a telecommunication network, in order to synchronize distributed clocks.

2. Description of the Prior Art

The Precision Time Protocol (PTP) is a standardized protocol used to synchronize clocks throughout a communication network. In 2008 a revised standard, IEEE 1588-2008, was released. This new version is also known as protocol PTPv2.

The operation of PTP relies on measurements of the communication path delay between a time source, referred to as a master, and a given time receiver, referred to as a slave. This process involves a message transaction between the master and the slave where the precise instants of transmission and reception are measured/captured—preferably at the hardware level. Messages containing captured time information could be adjusted to account for their path delay, therefore providing a more accurate representation of the time information conveyed.

The IEEE 1588-2008 standard describes hierarchical master-slave architecture for clock distribution. Under this architecture, a time distribution system consists of one or more communication media (network segments), and one or more clocks.

An ordinary clock is a device with a single PTP port and is either a source (master) or a destination (slave) of the synchronization distribution chain.

A boundary clock has multiple PTP ports and can accurately bridge synchronization network segments distributing the time reference from one network segment to another. A synchronization master is elected, as the relative time reference, for each of the network segments in the system. The absolute time reference is represented by the grandmaster. The grandmaster transmits synchronization information to clocks residing within its assign network domain/segment. Boundary clocks located on that network segment, recover the absolute time reference as accurately as possible, then distribute the recovered time reference to downstream network segments to which they are also connected.

The grandmaster clock represents the absolute time source. The grandmaster, the boundary clocks and the (ordinary) slave clocks are organized into a tree-like hierarchy with the grandmaster as the root of this hierarchy, the slave clocks as its leaves, and boundary clocks as intermediate elements. The grandmaster distributes the time reference towards the slave clocks across this tree-like hierarchy. The synchronization path between the grandmaster and a given slave clock can be decomposed as a succession of pairs of master and slave with the slave of the upstream segment becoming the master of the downstream segment. Between a given pair of the aforementioned master and slave are deployed transparent clocks.

IEEE 1588-2008 introduces a so called transparent clock associated with a network equipment used to convey PTP messages. A transparent clock modifies PTP message (headers) as these messages cross the network device. The transparent clock process consists in measuring the PTP message residence time within the network equipment and cumulate this measure in a field, located in the PTP message header, called the correctionField. This methodology improves the synchronization distribution accuracy by compensating for residence time variability across a network equipment.

There are two types of transparent clocks:
End-w-end transparent clocks measure and update the residence time for each synchronization packet (e.g. Synch message).
Peer-to-peer transparent docks perform similar operations as the end-to-end transparent clock. In addition, they measure the link delay associated with the ingress transmission path (upstream communication path delineated by either a Peer to Peer transparent clock or a Master) and cumulate this delay in the correctionField as well.

PTP delay measurement process of the path between any given pair of master and slave essentially involves the precision timing of two messages: A Sync message and a delay_Req message. Half of the round-trip delay obtained by the exchange of these two messages provides an estimation of the one-way (in the master to slave communication direction) delay. Accordingly, the accuracy of such estimation is generally impacted by two types of noises:
The first one is the Packet Delay Variation (PDV) which represents the variability of delays undergone by different synchronization packets on a given synchronization path. This variability makes that the estimated path delay associated to a synchronization message is noisy due to the difference in time between the path delay estimation event and the actual message transmission event.
The second type of noise is the delay asymmetry which represents the difference of path delays between one way of communication with regards to the opposite one. The slave time offset inaccuracy is theoretically equal to half of the delay asymmetry.

The PTPv2 protocol provides transparent clocks in order to address the aforementioned noises impacting the accuracy of the synchronization distribution.

Transparent clocks essentially measure synchronization message residence time within the associated network equipment. The measured residence times are cumulated in the correctionField located within the synchronization packet header. For stringent synchronization requirements, transparent clocks must perform all those operations very accurately and on the fly (at the PTPV2 message rate) without introducing additional delays.

Transparent clocks are generally deployed between a given pair of master and slave clocks in order to measure the synchronization message residence times across traversed network nodes. The sum of all measured residence times is taken off the end-to-end path delay by the slave (or the master). This makes nodes implementing transparent clocks "transparent" to the slave (or the master) in term of end-to-end path delay budget.

Within the IEEE 1588_2008 standard, the peer delay mechanism is also introduced for estimating delays of paths between adjacent transparent clocks, or between a transparent clock and the direct (i.e. adjacent) master or direct (i.e. adjacent) slave. Those measured path delays, as well as delay asymmetries, are cumulated within the Sync message correctionField by the peer-to-peer transparent clocks, so that the slave clock can be informed of them in addition to traversed network node residence times. With all this information, a slave can more precisely compute its offset with regards to the master clock time scale, as this computation is less noisy with regards to packet delay variation and delay asymmetry.

FIG. 1 illustrates the basic peer delay method in an exemplary part of a network comprising two IP routers IPRA and IPRB, each comprising a peer-to-peer (P2P) transparent clock (P2PTCA and P2PTCB) and at least two Precision Time Protocol (PTP) ports. For instance the IP router IPRA comprises two PTP ports PA1 and PA2; the IP router IPRB comprises two PTP ports PB1 and PB2. The PTP port PA1 of the router IPRA is directly linked (i.e. no intermediate network nodes) to the PTP port PB1 of the router IPRB.

The router IPRB sends a Pdelay_Req message to the router IPRA. The latter replies with a Pdelay_Resp message. The router IPRB then estimates the path delay induced by the link between the router IPRA and the router IPRB.

Later, the router IPRA receives a Synch message SYNC originating from a master clock and going at least to one slave clock, via the routers IPRA and IPRB. This message brings synchronization information to the slave.

With regards to FIG. 1 topology, there is no problem to associate the estimated path delay (or link delay) to the Sync message, because there is only one possible path. The peer-to-peer transparent clock PTPTCB of router IPRB updates the correctionField by taking into account the estimated path delay between the router IPRA and the router IPRB.

However, there are concerns within PTPv2 standard on the deployment of the peer delay mechanism, especially when peer delay entities are not directly linked, meaning that they are separated by at least one intermediate node (If the later is a network node that does not support PTPv2, or if it is a network node that comprises an end-to-end transparent clock);

For the rest of the description, we refer to this type of deployment as "non link-by-link" deployment of the peer delay mechanism.

It is noted that a peer-to-peer transparent clock and the associated network node perform very different specific operations. Thus, the peer-to-peer transparent clock only performs modifications over PTP message (headers) while the associated network is responsible for the encapsulation and the forwarding of the PTP messages.

For the rest of the document and for all the performed operations, the mention to the peer-to-peer transparent clock and the mention to the associated network node are interchangeable, as per the sake of simplicity.

Clause 11.4.4 of the IEEE 1588_2008 standard describes the peer delay mechanism concern as following:

"A delay requestor, Node-A, may receive 0, 1, or multiple Pdelay_Resp messages for each transmitted Pdelay_Req. Multiple responses can be detected by observing that the Source Port Identity fields of the Pdelay_Resp messages differ.

NOTE: Multiple responses can occur if there is an end-to-end transparent clock or an ordinary bridge or other similar multicast and multiport devices between Node-A and multiple Node-B devices. Although the multiple responses can be distinguished, there is no mechanism in this standard that allows the path length associated with each of the responses from the multiple Node-B devices to be correctly assigned to a received Sync message."

As described by the aforementioned clause, the concern is that there is no mechanism defined within PTPv2 standard to allow the receiver of a Sync message to associate the right path delay to this message, amongst different measured path delays (i.e. estimated via the peer delay mechanism). This concern essentially focuses on the multicast scenario. However, the standard concern can be generalized to include the unicast scenario as well.

FIGS. 2, 3, 4 illustrate the issue with path delay association in an exemplary part of a network comprising three IP routers IPRA, IPRB, IPRC, and an intermediate router IPRI. Each IP router IPRA, IPRB, IPRC comprises each a peer-to-peer transparent clock, respectively P2P TC A, P2P TC B, P2P TC C. Each IP routers IPRA and IPRB comprises at least two PTP ports, especially with PTP port PA on P2P TC A and PB on P2P TC B, having respectively IP addresses @IP-A and @IP-B.

The router IPRC comprises three PTP ports and especially PC1, PC2, both corresponding to a same IP address @IP-C. It is noted here that PTPv2 standard does not forbid the implementation of several PTP ports over the same network interface or communication port.

The intermediate IP router IPRI comprises three communication ports (i.e. IP ports).

The PTP port PA of the router IPRA is directly linked to a first IP port of the intermediate router IPRI. The IP port associated to PTP port PB of the router IPRB is directly linked to a second IP port of the intermediate router IPRI. The IP port associated to PTP port PC of the router IPRC is directly linked to a third IP port of the intermediate router IPRI.

The peer-to-peer transparent clock P2P TC C of router IPRC has two peers, respectively the peer-to-peer transparent clock P2P T CA in router IPRA, and the peer-to-peer transparent clock P2P TC B in router IPRB. There is no PTP clock in the intermediate IP router IPRI. This router is called a non-PTP aware equipment.

FIG. 2 illustrates the issue with the path delay association in a unicast scenario, and a network topology where the intermediate router IPRI is a non-PTP aware network element because it does not comprise a transparent clock. The peer-to-peer mechanism is deployed to measure the path delay between pairs of adjacent peer-to-peer transparent clocks:

P2P TC A and P2P TC C for a first path.
P2P TC B and P2P TC C for a second path.

The peer-to-peer transparent clocks P2P TC A and P2P TC B implement respectively two PTP ports corresponding to the addresses @IP-A and @IP-B. In this deployment of the peer delay mechanism, the peer-to-peer transparent clock P2P TC C implements two different PTP ports PC1 and PC2 over a same IP port corresponding to the address @IP-C. This is possible as not forbidden by the PTPv2 standard. Thus, the peer-to-peer transparent clock P2P TC C of router IPRC has the knowledge of two path delays, respectively the one between itself and peer-to-peer transparent clock P2P TC A and the one between itself and the peer-to-peer transparent clock P2P TC B.

Within the network topology and deployment as illustrated by FIG. 2, the peer-to-peer transparent clock P2P TC C has an issue to identify the path followed by the Sync message at the reception of the later. Indeed, neither the source (PTP) port identity nor the source IP address of the Sync message allows the clock P2P TC C to know whether the message has transited via the clock P2P TC A or via the clock P2P TC B, as the aforementioned pieces of information are those related to the far end master clock (not represented in the FIG. 2).

It is noted that FIG. 2 illustrates a specific case with two PTP ports PC1 and PC2 implemented on a same IP port of the router IPRC, this IP port corresponding to the address @IP-C. This is only for the sake of description simplicity.

However, the issue can be generalized to cases where each PTP port is associated to one transport protocol related port (e.g. IP port).

The issue cannot be resolved using only the PTPv2 protocol. Thus, the IEEE 1588_2008 standard presently provides with recommendations to restrict the use of peer delay mechanisms. This precludes, for instance, the deployment of a mix of end-to-end transparent clocks and peer-to-peer transparent clocks, or a mix of non-PTP aware network elements and peer-to-peer-transparent clocks, in order to optimize the deployment costs and also to relax deployment constraints.

FIG. 3 illustrates the issue with path delay association in another network topology that is restricted (or avoided) by the standard. The topology is the same as the one of FIG. 2 except that the intermediate router IPRI' comprises an end-to-end transparent clock E2E TC I. The peer-to-peer transparent clock P2P TC C of the router IPRC implements two PTP ports PC1 and PC2 on a same IP port corresponding to the address @IP-C.

The peer-to-peer mechanism is deployed to measure path delays between pairs of adjacent peer-to-peer transparent clocks:

P2P TC A and P2P TC C for a first path.
P2P TC B and P2P TC C for a second path.

This deployment is restricted (or avoided) by the standard as there is no means to associate to the Sync message the right path delay as explained above. The operator of the network should deploy in this case a link-by-link peer delay mechanism as illustrated by the FIG. 4.

Stressing on the advantage of the invention, FIG. 4 illustrates the path delay association in a deployment that is allowed by the standard. The topology is the same as the one of FIG. 2 except that the intermediate router IPRI' comprises a peer-to-peer transparent clock P2P TC I; and the peer-to-peer transparent clock P2P TC C of the router IPRC implements a single PTP port PC on an IP port corresponding to the address @IP-C.

In this deployment, the peer delay mechanism is deployed:

On the link between the peer-to-peer transparent clock P2P TC A of the router IPRA and the peer-to-peer transparent clock P2P TC I of the intermediate router IPRI'.
On the link between the peer-to-peer transparent clock P2P TC B of the router IPRB and the peer-to-peer transparent clock P2P TC I of the intermediate router IPRI'.
On the link between the peer-to-peer transparent clock P2P TC C of the router IPRC and the peer-to-peer transparent clock P2P TC I of the intermediate router IPRI'.

The later implementation is not cost effective especially when there is a mesh network, i. e. as per deployment of a great number of peer delay mechanisms, this number being equal to N×(N−1) where N is the number of network nodes.

Thus, there is a need to provide a more cost effective technical solution for supporting the peer delay mechanism.

This can be solved by applying the method according to the invention.

SUMMARY OF THE INVENTION

The object of the invention is a method for synchronizing distributed clocks by the Precision Time Protocol, in a telecommunication network, comprising the steps of:

sending a Sync message from one clock to another via a plurality of network nodes, a first of these nodes comprising a first peer-to-peer transparent clock and a second of these nodes comprising a second peer-to-peer transparent clock, estimating the path delay of the transmission path traveled by the synchronization message from the first to the second peer-to-peer transparent clocks, by:
    sending a Pdelay_Req message from the second peer-to-peer transparent clock to the first peer-to-peer transparent clock,
    and sending a Pdelay_Resp message from the first peer-to-peer transparent clock to the second peer-to-peer transparent clock, and then taking this path delay into account for updating the time information carried by a synchronization message, in the second peer-to-peer transparent clock;

characterized in that, for estimating said path delay it comprises the steps of:

using a tool, available in the transport protocol, for creating in network node associated to the first peer-to-peer transparent clock, a list of the network addresses of the network interfaces traversed by the synchronization message along its transmission path between the first and the second peer-to-peer transparent clocks;

ordering the first list into the order in which the network interfaces have been traversed by the Sync message;

creating a second list by reversing the order of the first list;

communicating the second list to the second peer-to-peer transparent clock;

and using the mechanism available in the transport protocol, in network nodes associated respectively to the first and the second peer-to-peer transparent clocks, to constrain the respective paths of Pdelay_Req and Pdelay_Resp messages so that their respective paths map to the second and first ordered lists of traversed interfaces.

Thanks to this method, the association of the right path delay to the Sync message travelling from a first to a second peer-to-peer transparent clock can be done without ambiguity even within a non link-by-link peer mechanism deployment. Thus, this method allows for the deployment of a mix of end-to-end transparent clocks and peer-to-peer transparent clocks, or a mix of non-PTP-aware network elements and peer-to-peer-transparent clocks, in order to optimize the deployment costs and also to relax deployment constraints.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 9 illustrates a second embodiment of the method according to the invention, in a heterogeneous environment (e.g. IP and Ethernet).

DETAILED DESCRIPTION OF THE PREFERRED EMBODIMENTS

FIGS. 5 to 8 illustrate a first embodiment of the method according to the invention, in a homogeneous IP environment, e. g. Internet Protocol (IP). They represent an exemplary part of a network comprising three IP routers IPRA, IPRB, IPRC, and three intermediate IP routers IPRI1, IPRI2, IPRI3. The peer-to-peer transparent clock P2P TC C of router IPRC has two PTPv2 peers, respectively peer-to-peer transparent clock P2P TC A in router IPRA, and peer-to-peer transparent clock P2P TC B in router IPRB. There is no PTP clock in the intermediate IP routers IPRI1, IPRI2, IPRI3.

The clocks P2P TC A and P2P TC B respectively implement two PTP ports respectively corresponding to the IP addresses @IP-A and @IP-B. It is noted that the clock P2P TC C implements two different PTP ports over two different IP ports corresponding respectively to the IP addresses @IP-C1 and @IP-C2.

The intermediate IP router IPRI1 has:
a first IP port directly linked to the IP port of the router IPRA, corresponding to the IP address @IP-A;
a second IP port directly linked to the IP port of the router IPRB, corresponding to the IP address @IP-B;
a third IP port directly linked to a first port of the IP router IPRI2;
a fourth IP port directly linked to a first port of the IP router IPRI3.

The IP router IPRI2 has a second IP port directly linked to the IP port of the router IPRC, corresponding to the IP address @IP-C1. The IP router IPRI3 has a second port directly linked to the IP port of the router IPRC, corresponding to the IP address @IP-C2.

Figure 1:
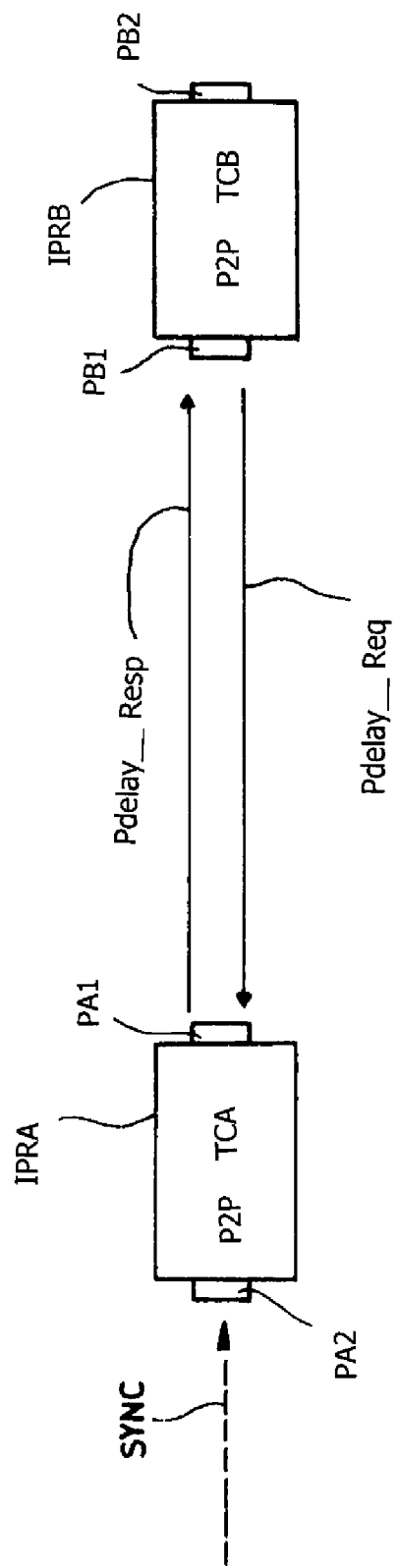
FIG. 1, described above, illustrates the basic peer delay method.
Figure 2:
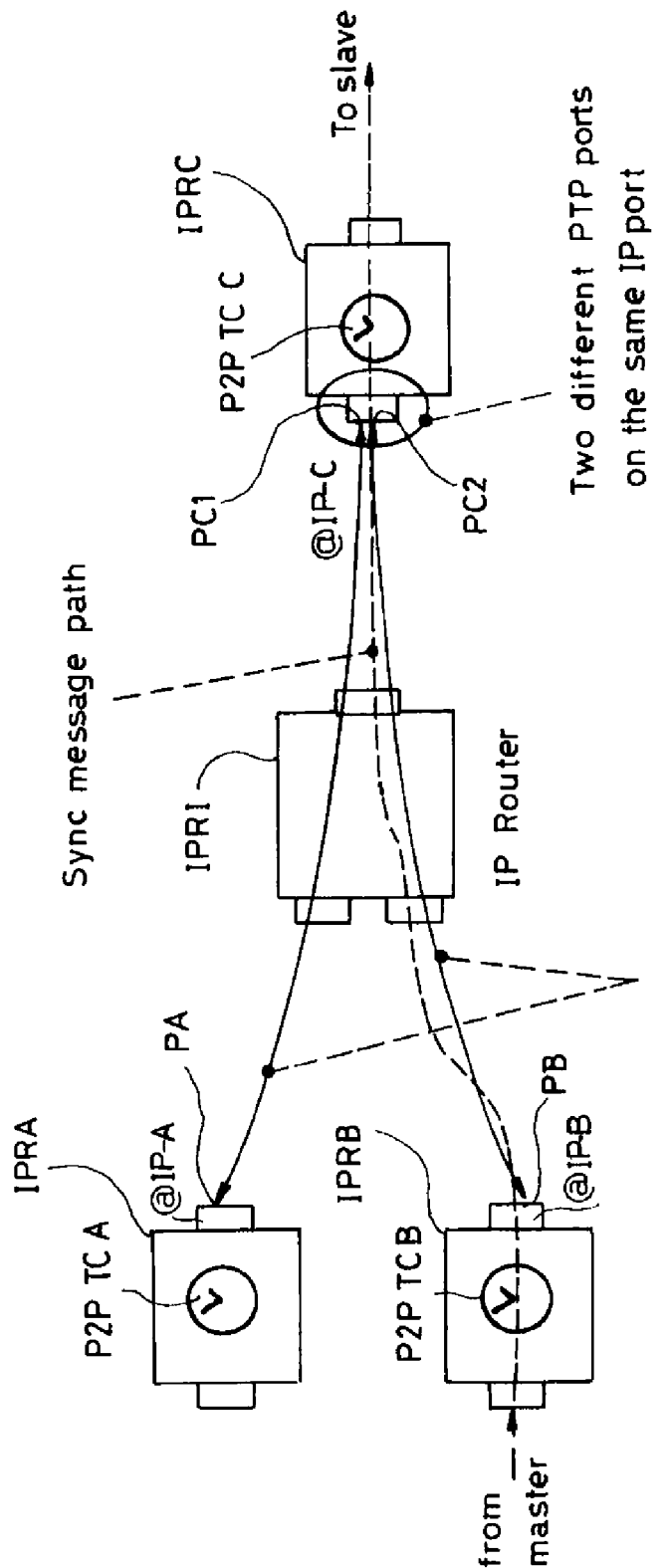
FIG. 2, described above, illustrates the issue with path delay association in a unicast scenario, and a network topology where the intermediate router IPRI is a non-PTP-aware network element.
Figure 3:
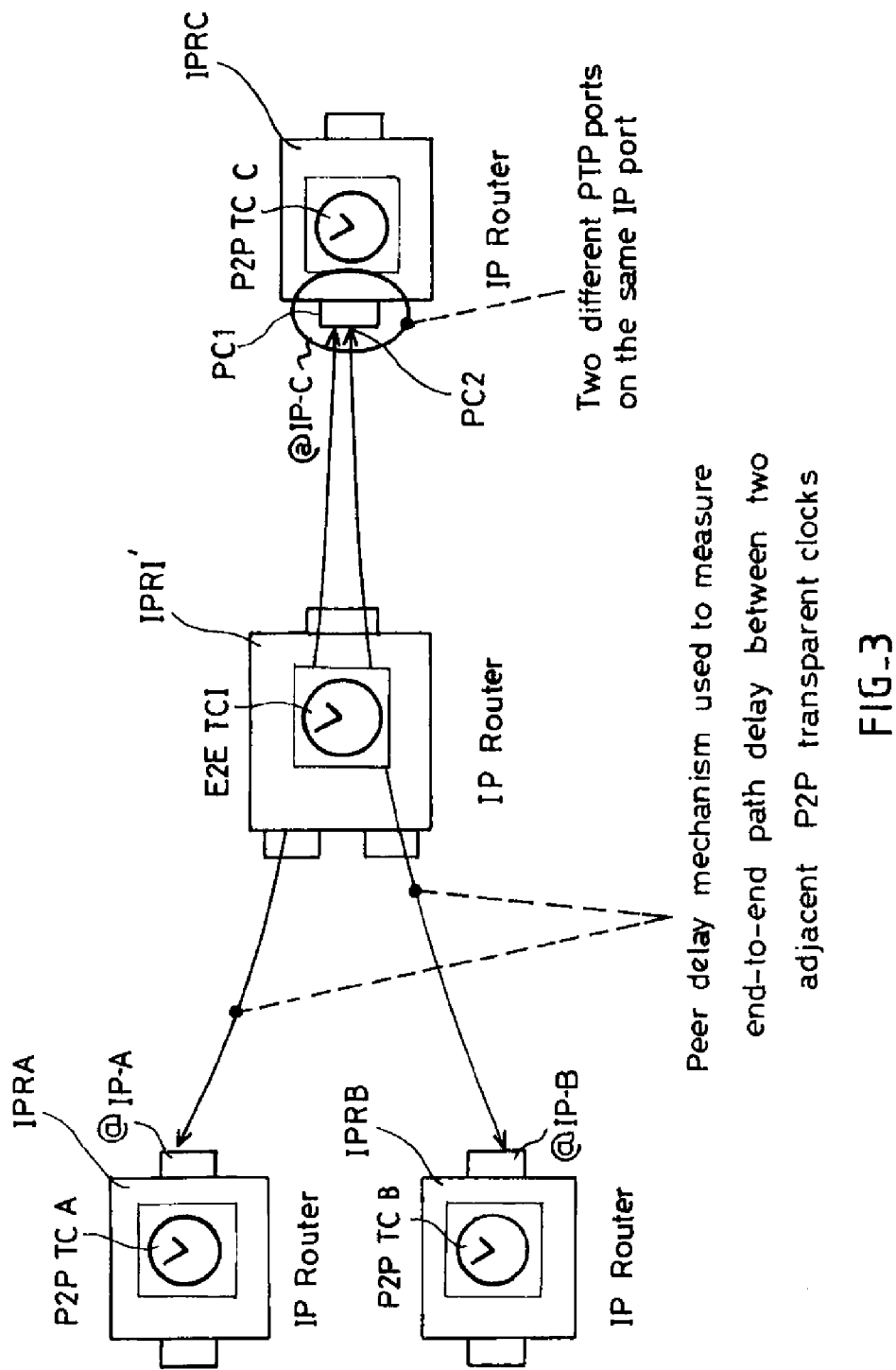
FIG. 3, described above, illustrates the issue with path delay association in another network topology that is restricted (or avoided) by the standard.
Figure 4:
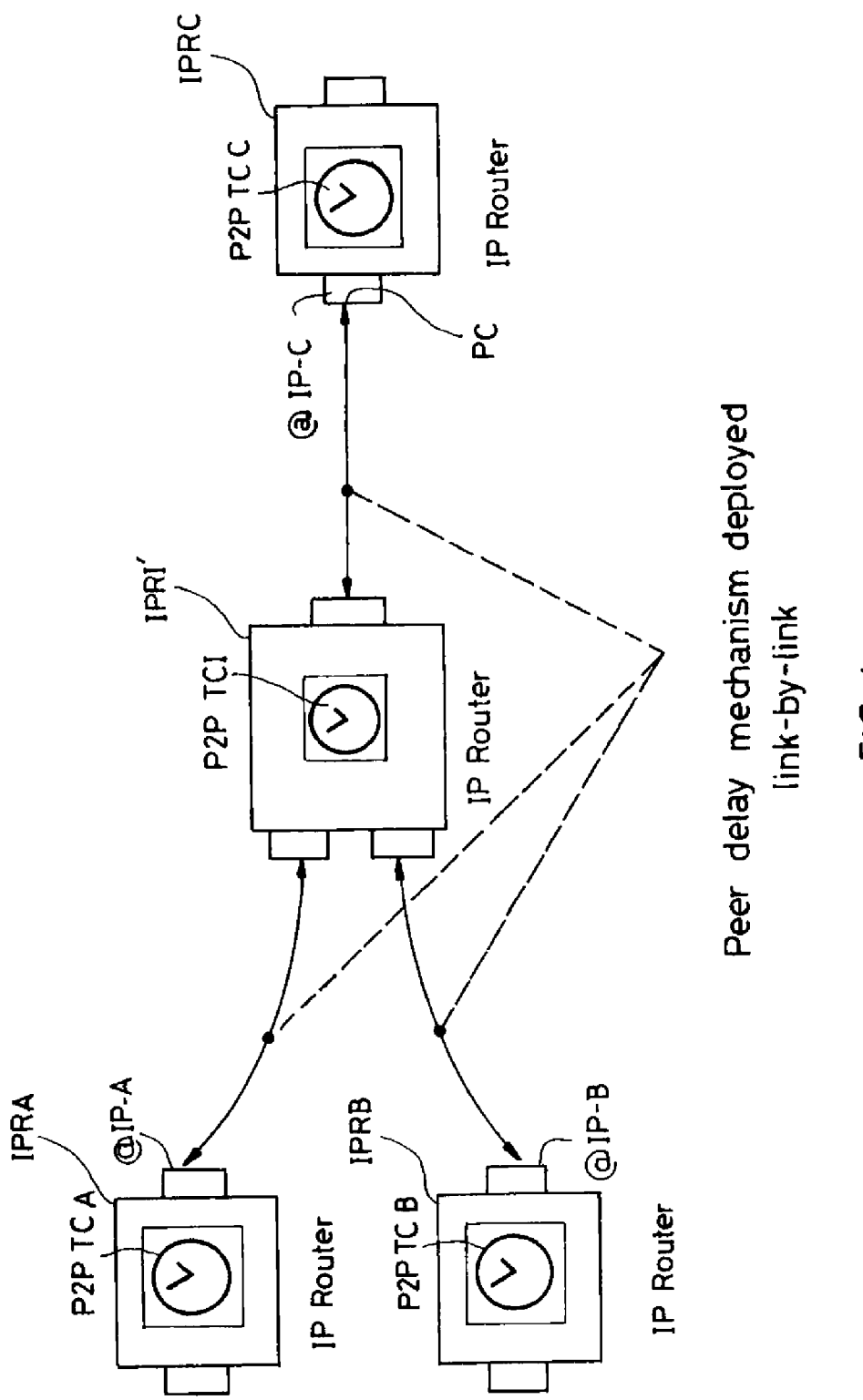
FIG. 4, described above, illustrates the path delay association in a deployment that is allowed by the standard.
Figure 5:
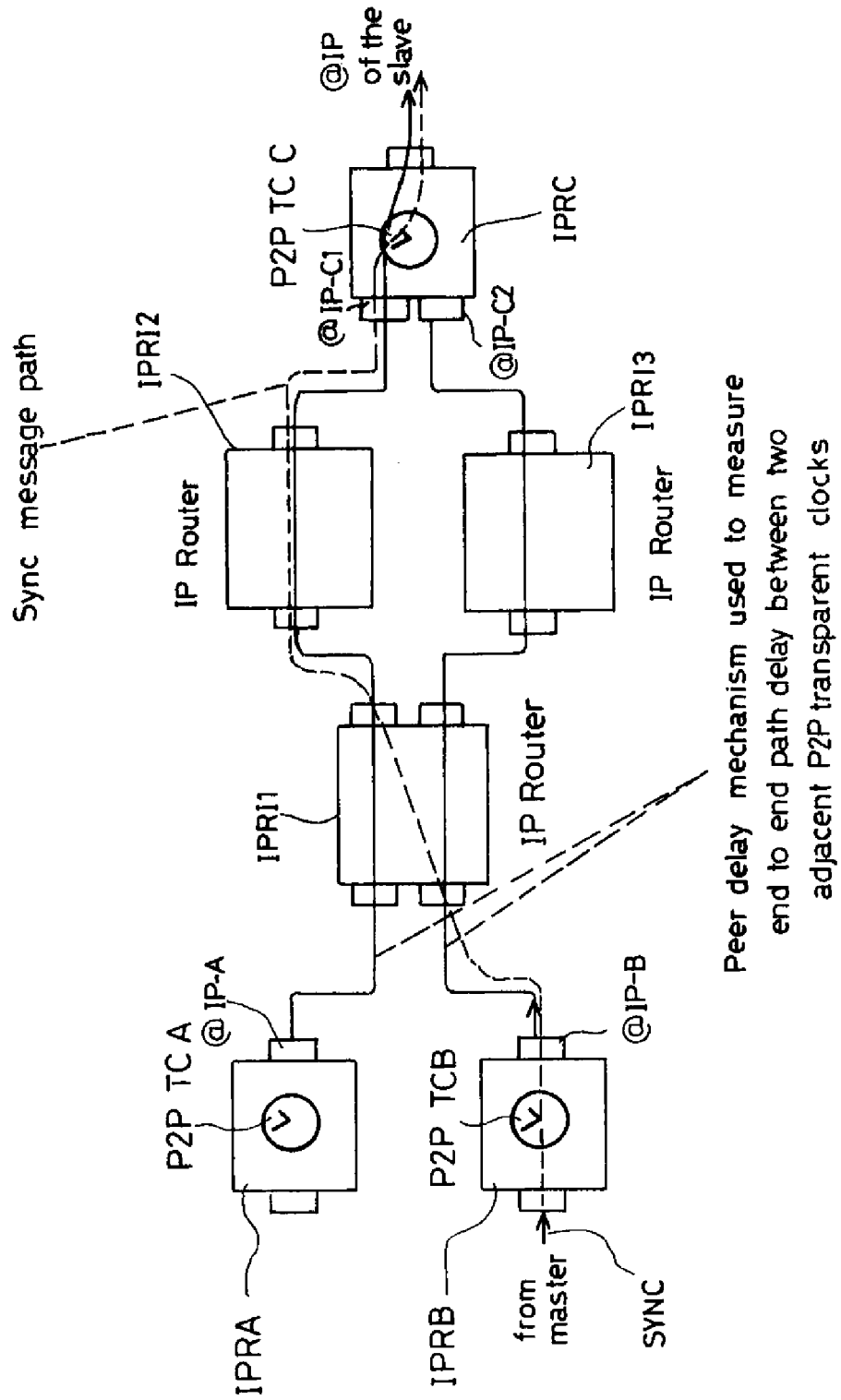
FIGS. 5 to 8 illustrate a first embodiment of the method according to the invention, in a homogeneous environment (e.g. IP only environment).

FIG. 5 illustrates a more general issue with regards to the issue illustrated by FIG. 1. It represents the same PTPv2 topology as the one represented by FIG. 1 but with a different network topology. This is a homogeneous environment as only IP encapsulation of PTPv2 messages is supported by all network nodes. For instance, a Synch message is forwarded from a master clock to the slave clock, via the routers IPRB, IPRI1, IPR3, IPRC.

With regards to FIG. 5 scenario, the peer-to-peer transparent clock P2P TC C has no path delay to associate to the received Sync message, even if it could have any means to identify the Sync path. This can be explained by the fact that the IP routing is generally based on the destination IP address. Since the destination IP address of the Sync message is the slave IP address, the routing of the Sync message does not necessarily follow the same network path as Pdelay_Resp messages which have either @IP-C1 or @IP-C2 as destination IP addresses.

Figure 6:
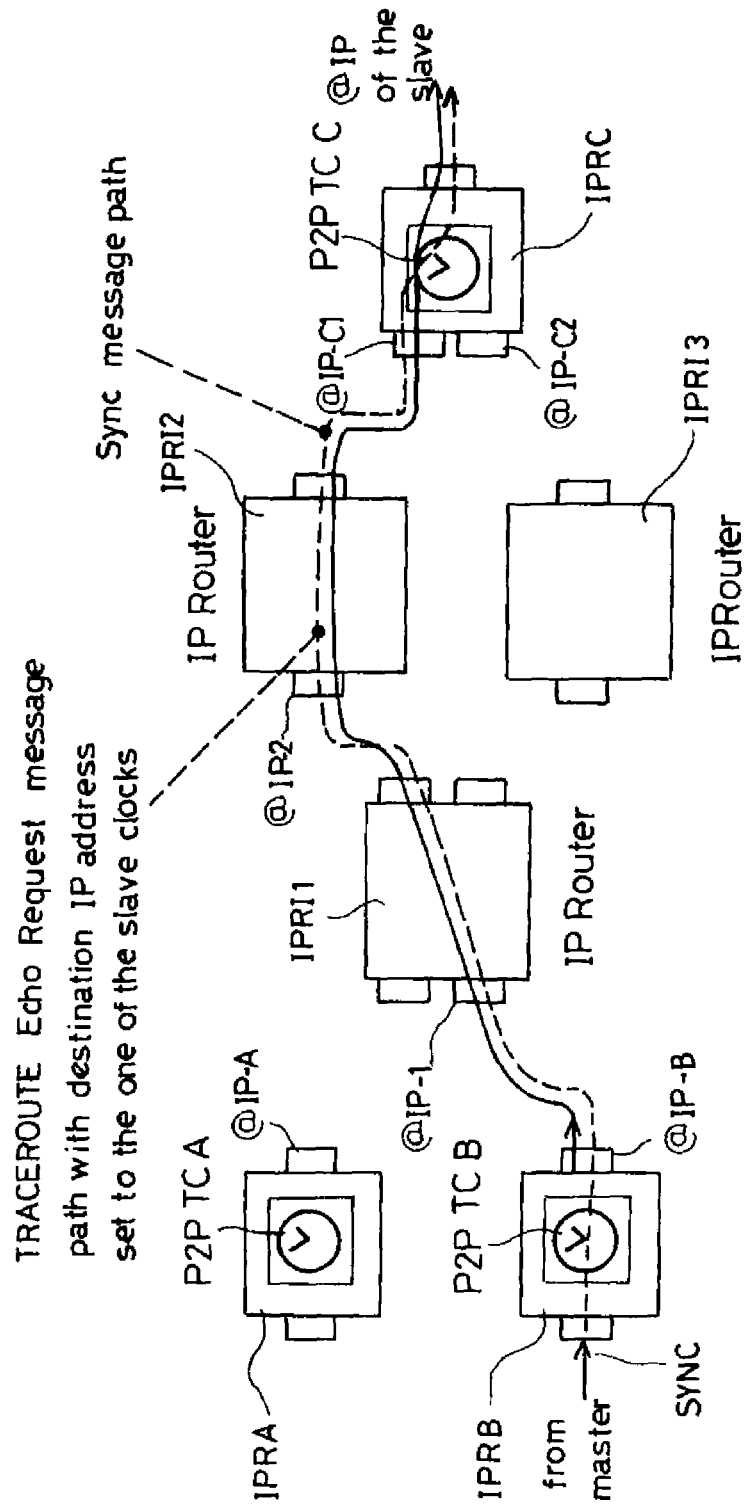
Figure 7:
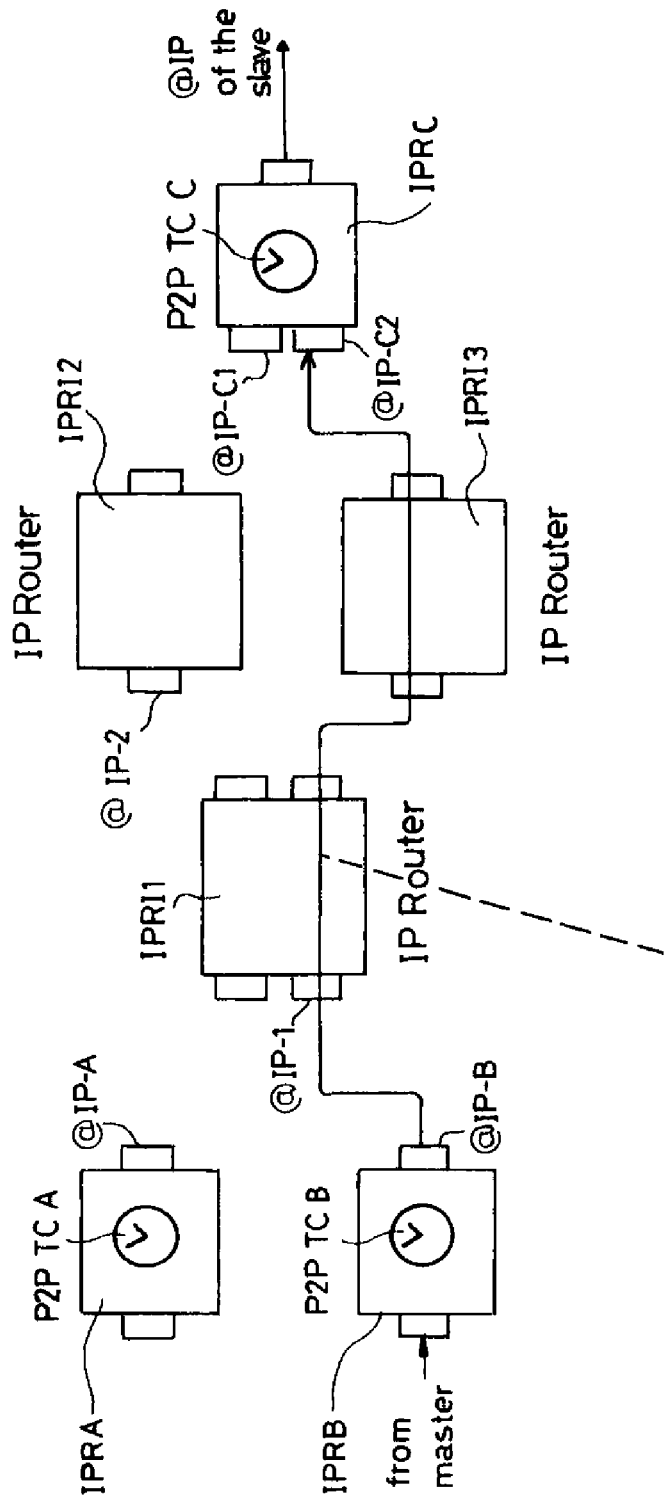
Figure 8:
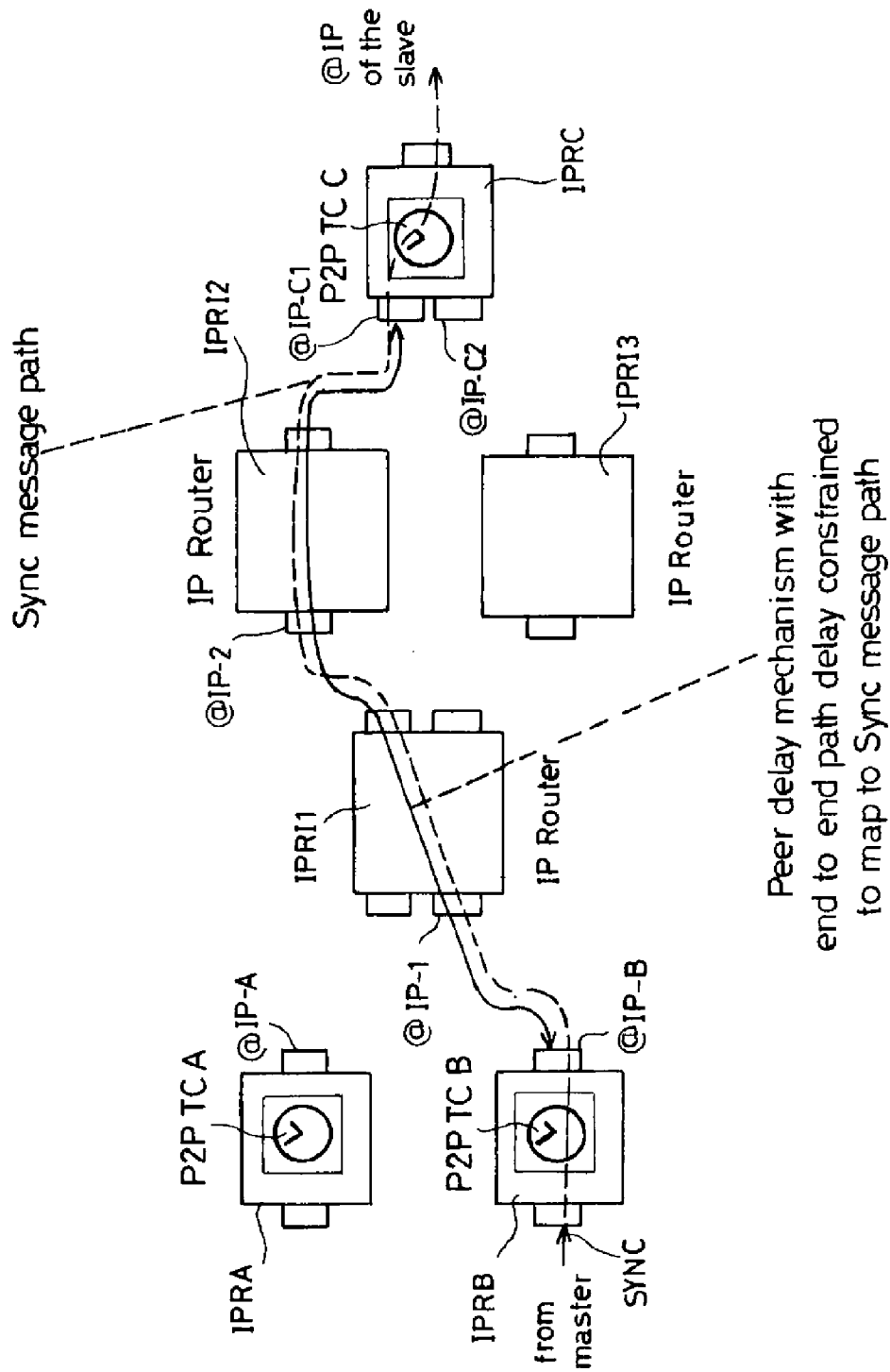

In order to work around this issue, a first embodiment of the method according to the invention consists of the automatic procedures illustrated by FIGS. 6, 7 and 8. This first embodiment comprises the following steps:

1) On FIG. 6, the peer-to-peer transparent clock P2P TC B detects the communication path of the Sync message (i.e. from the peer-to-peer transparent clock P2P TC B towards the slave clock via the IP router IPRI1. Its associated network node, which is the router IPRB, uses the IP TRACEROUTE command with the IP destination address set to the IP address of the slave clock. An IP TRACEROUTE ECHO Request message is forwarded through the IP routers IPRI1, IPRI2, IPRC, and so on until reaching the slave.

The output of the IP TRACEROUTE command provides the peer-to-peer transparent clock P2P TC B with an ordered list of traversed interface IP addresses. In the present scenario, the interested portion of the list is (@IP-1, @IP-2, @IP-C1. It is noted that the peer-to-peer transparent clock P2P TC B has means for associating the IP port corresponding to the address @IP-C1 with the peer-to-peer transparent clock P2P TC C (e.g. by configuration).

2) On FIG. 7, the peer-to-peer transparent clock P2P TC B builds the reverse ordered list (@IP-C1, @IP-2, @IP-1) and communicates this later to the peer-to-peer transparent clock P2P TC C, using a new Type Length Value (TLV) structure as defined by the protocol PTPv2. This PTPv2 structure is forwarded through the IP routers IPRI1, and IPRI3, for example.

This new structure of the TLV field is:

| Bits | | | | | | | | TLV | |
|---|---|---|---|---|---|---|---|---|---|
| 7 | 6 | 5 | 4 | 3 | 2 | 1 | 0 | Octets | Offset |
| tlvType (to be assigned by IEEE to identify the TLV) | | | | | | | | 2 | 0 |
| lengthField (length of the all the subsequent fields in octets) | | | | | | | | 2 | 2 |
| addressType (indicates the format of the addresses) | | | | | | | | 2 | 4 |
| One or more Addresses (ordered list of addresses with the first address at the top) | | | | | | | | M | 6 |

This TLV field can be carried within one of the first Pdelay_Resp messages transmitted by the peer-to-peer transparent clock P2P TC B to the peer-to-peer transparent clock P2P TC C.

Alternatively, the reverse ordered list TLV can be transported within a PTPv2 management message, transmitted by the peer-to-peer transparent clock P2P TC B to the peer-to-peer transparent clock P2P TC C.

3) On FIG. 8, the peer-to-peer transparent clock P2P TC B uses the ordered list of interface IP addresses and the peer-to-peer transparent clock P2P TC C uses the reverse ordered list in order to constrain respectively the Pdelay_Resp and the Pdelay_Req message paths so that they are transmitted on the same path experienced by the Sync message, meaning via the IP routers IPRI1 and IPR2. Within this method, only the path delay associated to the path traversed by the Sync message is measured. Thus, the peer delay mechanism can only apply on this particular path.

Within a pure IP environment, a method to constrain network path can consist in using source routing mechanism (Cf. IETF RFC 791).

Within an IP/MPLS environment, the path constraining method can consist in using the RSVP-TE (Resource ReserVation Protocol-Traffic Engineering) EXPLICIT ROUTE OBJECT (Cf. IETF RFC 3209).

FIG. 9 illustrates a second embodiment of the method according to the invention, in a heterogeneous environment. It is the same issue as the one of FIG. 5, but within a heterogeneous environment. We consider an exemplary part of a network comprising three successive domains D1, D2 and D3:

The first domain D1 and the third domain D3 are IP-based technology (e.g. PTP is encapsulated over UDP over IP—IEEE Standard 1588-2008 Annex D or Annex E). They are separated by the second domain which is Ethernet-based technology (i.e. IEEE Standard 1588-2008 Annex F is deployed). Alternatively, the second domain could implement MPLS-TP.

The first domain D1 is an IP or IP/MPLS (Multiprotocol Label Switching) environment. It includes two IP routers IPRA' and IPRB'. The later play the role of border network nodes separating the first domain D1 from the second domain D2. Those routers respectively comprise peer-to-peer transparent clocks P2PTCA' and P2PTCB'. They are connected to the second domain D2 thanks to a communication port. The communication port of the first router has the IP address IP-A and the MAC (Medium Access Control) address MAC-A. The communication port of the second router has the IP address IP-B and the MAC address MAC-B.

The second domain D2 is an Ethernet environment, meaning that the IEEE Standard 1588-2008 Annex F is implemented, eventually jointly with the IEEE 802.1q or the IEEE 802.1ah. or alternatively with MPLS-TP (Multiprotocol Label Switching-Transport Profile). In any case, D2 includes three Ethernet switches ESI1, ESI2, ESI3. Those switches are non-PTP aware equipments.

The third domain D3 is an IP or IP/MPLS environment. It includes the IP router IPRC'. The later plays the role of the border node separating the third domain D3 from the second domain D2. The IP router IPRC' comprises a peer-to-peer transparent clock P2P TC C' that implements two PTP ports over two respective communication ports in the D2 domain. The first communication port has the IP address IP-C1 and the MAC address MAC-C1. The second communication port has the IP address IP-C2 and the MAC address MAC-C2.

The Ethernet switch ESI1 has:
a first port directly linked to the Ethernet port of the router IPRA', corresponding to the MAC address MAC-A;
a second port directly linked to the Ethernet port of the router IPRB', corresponding to the MAC address MAC-B;
a third port directly linked to a first port of the Ethernet switch ESI2;
a fourth port directly linked to a first port of the Ethernet switch ESI3.

The Ethernet switch ESI2 has a second port directly linked to the Ethernet port of the router IPRC', corresponding to the MAC address MAC-C1. The Ethernet switch ESI3 has a second port directly linked to the Ethernet port of the router IPRC, corresponding to the MAC address MAC-C2.

The peer-to-peer transparent clock P2P TC C of router IPRC has two peers, respectively peer-to-peer transparent clock P2P TC A' in router IPRA', and peer-to-peer transparent clock P2P TC B' in router B'. There is no PTP clock implemented on the Ethernet switches ESI1, ESI2, ESI3. The later are non-PTP aware nodes.

For instance, a Sync message SYNC is forwarded from a master to a slave, through the router IPRB', the Ethernet switches ESI1 and ESI2, and the IP router IPRC'.

Within this heterogeneous environment, the peer-to-peer transparent clocks P2P TC A', P2P TC B', P2P TC C' are border nodes between technology domains:
at one side, they use a PTP message encapsulation method over IP (e.g. the Sync message is encapsulated over UDP over IP—IEEE standard 1588_2008 Annex D or Annex E);
at the other side, they use a PTP message encapsulation method that is Ethernet (e.g. the Pdelay_Req/Pdelay_Resp messages are encapsulated over Ethernet—IEEE standard 1588_2008 Annex F).

Thus, the peer-to-peer transparent clocks can deal with two different encapsulation technologies and can perform the interworking between these later. It is noted that the Sync message traversed the Ethernet-based domain transparently.

This second embodiment of the method according to the invention comprises the following steps:

1) The peer-to-peer transparent clock P2P TC B', which detects the transmission direction of the Sync message (i.e. from the transparent clock P2P TC B' towards the slave clock), monitor its IP destination address (which is the slave IP address) and particularly its next hop IP address which is IP-C1 (e.g. lookup in the IP routing table)

2) The peer-to-peer transparent clock P2P TC B' obtains the MAC address MAC-C1 associated to the IP address IP-C1 using for instance the Address Resolution Protocol called as ARP (IETF RFC 826). This could also be obtained via some pre-configurations.

3) The peer-to-peer transparent clock P2P TC B' uses the Ethernet OAM TRACEROUTE command with the MAC destination address set to MAC-C1.

The output of the Ethernet OAM TRACEROUTE command provides the peer-to-peer transparent clock P2P TC B' with an ordered list of interface MAC addresses, corresponding to the interfaces traversed by the Synch message SYNC within the second domain D2

4) The peer-to-peer transparent clock P2P TC B' builds a second list by reversing the first list, and communicates this second list to the peer-to-peer transparent clock P2P TC C', by using a new TLV structure (i.e. now the addressType should indicate MAC address and not IP addresses). Again, this new TLV field can be transported within one of the first Pdelay_Resp messages transmitted by the peer-to-peer transparent clock P2P TC B' to the peer-to-peer transparent clock P2P TC C'. Alternatively, the reverse ordered list can be transported within a PTPv2 management message transmitted by the peer-to-peer transparent clock P2P TC B' to the peer-to-peer transparent clock P2P TC C'.

5) The peer-to-peer transparent clock P2P TC B' uses the ordered list of interface MAC addresses, and the peer-to-peer transparent clock P2P TC C' uses the reverse ordered list, in order to constrain respectively the Pdelay_Resp and the Pdelay_Req message paths.

A method to constrain the communication path within an Ethernet environment could consist in using virtual local area networks (VLAN) IEEE 802.1q or IEEE 802.1ah. Alternatively, MPLS-TP (MPLS Transport Profile) can be used for signaling of the path, using RSVP-TE and EXPLICIT ROUTE OBJECT.

The main difference with respect to the previous described homogeneous environment is that the peer-to-peer transparent clocks here estimate the path delay, of the Sync message transported over UDP over IP (e.g. IEEE standard 1588 annex D), by using PTP messages (i.e. Pdelay_Req/Pdelay_resp) encapsulated over Ethernet data packets (e.g. IEEE standard 1588_2008 annex F).

Traditionally, it is recommended to implement Boundary Clocks at the border of different encapsulation technology domains. But thanks to the present invention, the peer-to-peer transparent clocks can be seamlessly supported, with a relative reduction in complexity. Thus the invention solves the restrictions related to the deployment of peer delay mechanism. It allows for inserting non-PTP aware nodes and/or end-to-end transparent clocks amongst peer-to-peer transparent clocks, making the deployment more flexible.

Also, thanks to the reduction of the peer delay instances, it allows for reducing the number of peer delay messages, reducing network resource consumption, especially within a mesh large-scaled network.

Finally, as illustrated by the second embodiment (i.e. heterogeneous environment), the method according to the invention allows for avoiding boundary clocks at technology domain border. This may significantly reduce the complexity of the synchronization architecture.

The method according to the invention can be implemented over any other kind of packet-based network.

The method according to the invention can be implemented by agents, each agent being a processor-executable program performing the method when the program is run on a processor. An example of implementation is described in the document EP 2.408.128.

One or more agent is implemented in each network node equipped with a PTP clock such as an ordinary clock, a boundary clock or a transparent clock. These agents allow for providing an interworking between different network entities and a PTP clock within a given network node.

Indeed, the interworking agent can be seen as an extension of the PTP protocol stack and typically cannot be installed without PTP module. An interworking agent has two types of interfaces:

a PTP-side interface to interact with PTP entities at an application level, and at least one network-side interface to interact with network entities (an operations, administration and maintenance (OAM) plane or a control plane) at a network level.

Thus, the interworking agent can communicate on the one hand with the PTP clock and on the other hand with network entities. Therefore it is an interface between both sides/levels that enables to inform of events occurred at one level to the other one such as a failure event at one level requiring a reconfiguration or a modification of some parameters at the other level.

There is claimed:

1. A method for synchronizing distributed clocks by the Precision Time Protocol, in a telecommunication network, comprising the steps of:

sending a Sync message from one clock to another via a plurality of network nodes, a first of these nodes nodes comprising a first peer-to-peer transparent clock and a second of these nodes comprising a second peer-to peer transparent clock, estimating the path delay of the transmission path travelled by the synchronization message from the first to the second peer-to-peer transparent clocks, by:

sending a Pdelay_Req message from the second peer-to-peer transparent clock to the first peer-to-peer transparent clock, and sending a Pdelay_Resp message from the first peer-to-peer transparent clock to the second peer-to-peer transparent clock, and then taking this path delay into account for updating the time information carried by a synchronization message, in the second peer-to-peer transparent clock;

where in, for estimating said path delay it comprises the steps of:

using a tool, available in the transport protocol, for creating in network node associated to the first peer-to-peer transparent clock, a list of the network addresses of the network interfaces transversed by the synchronization message along its transmission path between the first and the second peer-to-peer transparent clocks;

ordering the first list into the order in which the network interlaces have been traversed by the Sync message;

creating a second list by reversing the order of the first list;

communicating the second list to the second peer-to-peer transparent clock;

and using the mechanism available in the transport protocol, in network nodes associated respectively to the first and the second peer-to-peer transparent clocks to constrain the respective paths of Pdelay_Req and Pdelay_Resp messages so that their respective paths map to the second and first ordered lists of traversed interfaces.

2. A method according to claim 1, wherein communicating the second list to the second peer-to-peer transparent clock comprises the step of putting the second list into a TLV field of a Pdelay_Resp message transmitted by the first peer-to-peer transparent clock to the second peer-to-peer transparent clock.

3. A method according to claim 1, wherein communicating the second list to the second peer-to-peer transparent clock comprises the step of putting the second list into a Precision Time Protocol management message transmitted by the first peer-to-peer transparent clock to the second peer-to-peer transparent clock.

4. A method according to claim 1, for a homogeneous environment where UDP/IP encapsulation of PTPv2 messages is supported by all network nodes, wherein, for estimating said path delay it comprises the step of using the IP TRACEROUTE command with the IP destination address set to the address of a slave clock, for communicating the second ordered list of IP interface addresses to the second peer-to-peer transparent clock it comprises the step of inserting it into a PTP message encapsulated over an IP data packet, and for constraining Pdelay_Req and Pdelay_Resp respective paths, it comprises the step of using RSVP-TE signaling with EXPLICIT_ROUTE OBJECT.

5. A method according to claim 1, for a homogeneous environment where Ethernet encapsulation of PTPv2 messages is supported by all network nodes, wherein, for estimating said path delay it comprises using the Ethernet OAM TRACEROUTE command, and using a medium access control destination address set to the one of a slave clock, for communicating the second ordered list of IP interface addresses to the second peer-to-peer transparent clock it comprises the step of inserting it into a PTP message encapsulated over an Ethernet data packet, and for constraining Pdelay_Req and Pdelay_Resp respective paths, it comprises the step of using Virtual LAN or RSVP-TE with EXPLICIT_ROUTE OBJECT.

6. A method according to claim 1, for a heterogeneous environment composed of three successive technology domains D1, D2, D3 with D1 and D3 separated by D2, and with D1 and D3 implementing the first encapsulation technology and D2 implementing the second encapsulation technology, and where D1 and D2 are separated by the first node comprising a first peer-to-peer transparent clock and D2 and D3 are separated by the second node comprising a second peer-to-peer transparent clock, wherein, for monitoring the Sync message first technology destination address, the first node IPRB' uses tools related to the first technology protocols, for discovering the Sync message first technology next hop address, the first node IPRB' performs a lookup with the Sync message first technology destination address into its routing or switching tables related to the first technology, for obtaining the second technology address associated to the Sync message first technology next hop address, the first node uses address resolution tools amongst tools allowing for the interworking before the two technologies, for estimating said path delay across D2 it comprises the step of using the second technology OAM TRACEROUTE command, with the destination address set to the second technology address obtained in the previous step, for communicating the second ordered list of second technology interface addresses to the second peer-to-peer transparent clock it comprises the step of inserting it into a PIP message encapsulated accordingly to the second encapsulation technology, and for constraining Pdelay_Req and Pdelay_Resp respective paths, it comprises the step of using path constraining tools implemented within the second technology.

7. A method according to claim 6 where the first encapsulation technology is IP-based implementing the IEEE standard 1588_2008 annex D and the second technology is Ethernet-based implementing the IEEE standard 1588_2008 annex F jointly with the IEEE 802.1q.

8. A method according to claim 6 where the first encapsulation technology is IP-based implementing the IEEE standard 1588_2008 annex E and the second technology is Ethernet-based implementing IEEE standard 1588_2008 annex F jointly with IEEE 802.1q.

9. An interworking agent comprising a set of machine executable program instructions, which, when executed on a processor, cause the processor to perform all the method steps of the method according to claim 1.

10. A digital data storage medium storing a set of machine executable program instructions, which, when executed on a processor, cause the processor to perform all the method steps of the method according to claim 1.

11. A computer program product comprising processor-executable instructions for performing a method when the program is run on a processor, the method comprising the steps of claim 1.

* * * * *